United States Patent [19]

Koga et al.

[11] Patent Number: 4,849,293

[45] Date of Patent: Jul. 18, 1989

[54] AMORPHOUS POLYESTER COMPOSITIONS AND USES THEREOF

[75] Inventors: Hitoshi Koga; Kazuo Iwata, both of Iwakuni; Masushi Mishimoto, Kuga; Nikio Hashimoto, Ootake, all of Japan

[73] Assignee: Mitsui Petrochemical Industries, Ltd., Japan

[21] Appl. No.: 103,350

[22] Filed: Oct. 1, 1987

[30] Foreign Application Priority Data

Oct. 1, 1986 [JP] Japan ................. 61-231244
Oct. 6, 1986 [JP] Japan ................. 61-236119

[51] Int. Cl.⁴ ................. C08L 67/02; C08L 51/06
[52] U.S. Cl. ................. 428/447; 428/458; 524/427; 524/445; 524/449; 524/451; 524/504; 524/508; 524/513; 525/64; 525/68; 525/101; 525/176
[58] Field of Search ............ 525/64, 68, 101, 176; 524/504, 508, 513, 451, 427, 445, 449; 428/447, 458

[56] References Cited

U.S. PATENT DOCUMENTS 3,644,245  2/1972  Flanagan ................. 525/101
3,970,709  2/1976  Owston ................. 525/64

FOREIGN PATENT DOCUMENTS 57-203546  12/1982  Japan .
59-080454   5/1984  Japan .

*Primary Examiner*—Patricia Short
*Attorney, Agent, or Firm*—Sherman and Shalloway

[57] ABSTRACT

An amorphous polyester composition according to the present invention comprises (A) a low crystalline polyolefin modified with unsaturated carboxylic acids, (B) an amorphous polyester, (C) a silane coupling agent and (D) an optional inorganic filler, wherein (A) forms a matrix phase and (B) forms a domain phase. This amorphous polyester composition has excellent adhesion properties to different materials such as metal and has excellent damping performance, and therefore a damping material having excellent initial adhesion properties and water-resistant adhesion properties and excellent damping performance, particularly at high temperatures can be obtained from such an amorphous polyester composition.

17 Claims, 1 Drawing Sheet

AMORPHOUS POLYESTER COMPOSITIONS AND USES THEREOF

TECHNICAL FIELD OF THE INVENTION

This invention relates to amorphous polyester compositions and uses thereof, and, more particularly, to amorphous polyester compositions having excellent adhesion properties to different materials such as metal as well as to damping materials formed from the amorphous polyester compositions having good water-resistance adhesion properties and excellent damping performance at a high temperature region.

BACKGROUND OF THE INVENTION

Japanese patent publication No. 28223/1984 (corresponding to U.S. Pat. No. 4,172,859) describes a composition comprising a polyester and a modified polyolefin wherein the polyester forms a matrix phase and the modified polyolefin forms a domain phase. Further, Japanese patent publication No. 54058/1982 describes a composition wherein a modified polyolefin is incorporated into a polyester in a weight ratio of modified polyolefin to polyester of from 1:10 to 4:1. Furthermore, Japanese patent laid-open publication No. 203546/1982 describes a metal product coated with a resin composition comprising a polyolefin which may be modified and a polyester which may be amorphous.

On the other hand, there have been proposed compositions having a silane coupling agent incorporated therein. Japanese patent laid-open publication No. 253536/1985 describes a sandwich steel plate for damping wherein a viscoelastic material which may contain a filler treated with a silane coupling agent is used to form an intermediate layer. Further, Japanese patent laid-open publication No. 31838/1980 describes a sandwich steel plate wherein a molten mixture of a polyolefin, a silane coupling agent, a filler and a radical generator is used to form an intermediate layer.

Among the prior arts described above, an object of the polyester composition disclosed in Japanese patent publication No. 28223/1984 is to improve the impact characteristics of the polyester. The matrix and domain phases are different from those of an amorphous polyester composition according to the present invention. Naturally, Japanese patent publication No. 28223/1984 discloses only crystalline polyesters. Further, it does not describe the incorporation of a silane coupling agent. Furthermore, it does not describe nor suggest the adhesion to different materials such as metal and damping performance at all.

Further, an object of the polyester composition disclosed in Japanese patent publication No. 54058/1982 is to improve their impact characteristics. Accordingly, all of the polyesters disclosed are crystalline. Similar to Japanese patent publication No. 28223/1984 described above, Japanese patent publication No. 54058/1982 does not suggest the incorporation of a silane coupling agent, the adhesion to different materials and damping performance. Japanese patent laid-open publication No. 203546/1982 does not describe the incorporation of a silane coupling agent in polyester compositions. It does not suggest their damping performance.

Japanese patent laid-open publication No. 253536/1985 does not describe amorphous polyesters and modified low crystalline polyolefins. Further, a silane coupling agent is used to improve the dispersibility in incorporating a filler into a composition, and Japanese patent laid-open publication No. 253536/1985 does not suggest that the silane coupling agent is used alone. Furthermore, both the filler and the coupling agent are incorporated in large amounts.

In the polyolefin composition disclosed in Japanese patent laid-open publication No. 31838/1980, the presence of the filler is essential. Further, as can be seen from the composition, the silane coupling agent is used to graft it to a base polyolefin to modify the polyolefin. Of course, Japanese patent laid-open publication No. 31838/1980 suggests neither amorphous polyesters nor modified low crystalline polyolefins.

The prior art compositions described above are not entirely satisfactory with respects to adhesion properties to different materials, and damping performance, particularly at a high temperature region.

OBJECTS OF THE INVENTION

An object of the present invention is to provide an amorphous polyester composition having good adhesion properties to different materials such as metal, i.e., initial adhesion properties and good water-resistant adhesion properties.

Another object of the present invention is to provide a damping material comprising an amorphous polyester composition having excellent damping performance, particularly at a high temperature region, e.g., from 80° to 100° C.

Other objects of the present invention will be become apparent from the following description.

SUMMARY OF THE INVENTION

A first amorphous polyester composition according to the present invention is a resin composition comprising (A) a low crystalline polyolefin modified with an unsaturated carboxylic acid, (B) an amorphous polyester and (C) a silane coupling agent, wherein (A) is present from 30% to 60% by weight; (B) is present from 40% to 70% by weight; (C) is present from 0.05 to 4 parts by weight per 100 parts by weight of the total amount of (A) and (B); and (A) forms a matrix phase and (B) forms a domain phase.

A second amorphous polyester composition according to the present invention comprises (A) a low crystalline polyolefin modified with an unsaturated carboxylic acid, (B) an amorphous polyester, (C) a silane coupling agent and (D) an inorganic filler wherein (A) is present from 30% to 60% by weight; (B) is present from 40% to 70% by weight; (C) is present from 0.05 to 4 parts by weight per 100 parts by weight of the total amount of (A) and (B); (D) is present from 0.5 to 4 parts by weight per 100 parts by weight of the total amount of (A) and (B); and (A) forms a matrix phase, and (B) forms a domain phase.

The first amorphous polyester composition or second amorphous polyester composition as described above is used as a damping material.

DETAILED DESCRIPTION OF THE INVENTION

Figure 1:
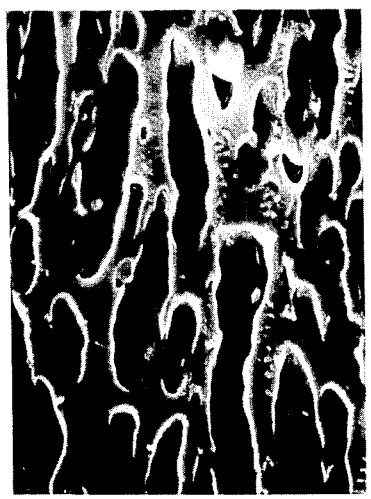
FIGS. 1 and 2 are electron micrographs of amorphous polyester compositions according to the present invention.

Amorphous polyester compositions according to the present invention and their uses will be described in detail.

(A) Low Crystalline Polyolefin

A low crystalline polyolefin which is the base of a modified low crystalline polyolefin which is one component of an amorphous polyester composition of the present invention is a polyolefin having a crystallinity of from 0% to 20%. Examples of such low crystalline polyolefins include homopolymers or copolymers of alpha-olefins such as ethylene, propylene, 1-butene, 1-hexene, 1-heptene, 4-methyl-1-pentene, 1-octene, and 1-decene.

Examples of unsaturated carboxylic acids used to modify said low crystalline polyolefins include unsaturated carboxylic acids such as acrylic acid, methacrylic acid, alpha-ethylacrylic acid, maleic acid, fumaric acid, itaconic acid, citraconic acid, tetrahydrophthalic acid, methyl tetrahydrophthalic acid, endo-cis-bicyclo[2.2.1-]hept-5-ene-2,3-dicarboxylic acid (Nadic Acid ®), and methyl-endo-cis-bicyclo[2.2.1]hept-5-ene-2,3-dicarboxylic acid (Methyl Nadic Acid ®); and derivatives of unsaturated carboxylic acids such as acid halides, amides, imides, acid anhydrides and esters of said unsaturated carboxylic acids. Examples of such compounds include maleoyl chloride, maleimide, maleic anhydride, citraconic anhydride, monomethyl maleate, and dimethyl maleate. Of these, unsaturated dicarboxylic acid and acid anhydrides thereof are suitable. Maleic acid, Nadic Acid and acid anhydrides thereof are particularly suitable.

The modified low crystalline polyolefins (A) are obtained by grafting the unsaturated carboxylic acid described above to low crystalline polyolefins. The modified low crystalline polyolefins obtained by grafting from 0.3 to 0.6 parts by weight of the unsaturated carboxylic acid to 100 parts by weight of the low crystalline polyolefins are usually used as a principal component.

(B) Amorphous Polyester

Amorphous polyesters (B) include polyesters formed by reacting (a) a dihydroxy compound unit selected from aliphatic glycols such as ethylene glycol, propylene glycol, 1,4-butane diol, neopentyl glycol, and hexamethylene glycol, alicyclic glycols such as cyclohexanedimethanol, aromatic dihydroxy compounds such as bisphenol, 1,3-bis(2-hydroxyethoxy)benzene, 1,4-bis(2-hydroxyethoxy)benzene and mixtures thereof; with (b) a dicarboxylic acid unit selected from aromatic dicarboxylic acids such as terephthalic acid, isophthalic acid, and 2,6-naphthalenedicarboxylic acid, aliphatic dicarboxylic acids such as oxalic acid, succinic acid, adipic acid, sebacic acid, and undecanedicarboxylic acid, alicyclic dicarboxylic acids such as hexahydroterephthalic acid, and mixtures thereof. The polyesters may be modified with a small amount of polyhydroxy compounds having at least three valence such as triol or polycarboxylic acids having at least three valence such as tricarboxylic acid provided that the resulting polymers are amorphous resins and exhibit thermoplasticity.

Examples of such amorphous polyesters include (i) amorphous isophthalate polymers formed by reacting (a) a dicarboxylic acid component wherein from 15 to 100 mole %, preferably from 50 to 100 mole % of the dicarboxylic acid component is isophthalic acid and the remainder is other dicarboxylic acids such as terephthalic acid, with (b) a dihydroxy compound component such as ethylene glycol; and (ii) amorphous terephthalate copolymers formed by reacting (a) a dicarboxylic acid component consisting of terephthalic acid with (b) a dihydroxy compound component wherein from 15 to 50 mole % of the dihydroxy compound component is cyclohexanedimethanol and the remainder is other dihydroxy compound component such as ethylene glycol.

Of the amorphous isophthalate polymers described above, the isophthalate polymers wherein the remainder of the dicarboxylic acid component is terephthalic acid, and from 5 to 90 mole %, preferably from 10 to 15 mole % of the dihydroxy compound is 1,3-bis(2-hydroxyethoxy)benzene or 1,4-bis(2-hydroxyethoxy)benzene and from 95 to 5 mole %, preferably from 90 to 75 mole % of the dihydroxy compound is ethylene glycol, are preferable because such isophthalate polymers have the excellent damping properties at a temperature of from 80° to 100° C. in comparison with the other polyester used in the same amount.

While the glass transition temperature (Tg) of such amorphous polyesters (B) can be present in various ranges, it is usually from about 40° to 100° C., preferably from 50° to 60° C.

By the amorphous polyester as used herein is meant a resin which does not occur any devitrification due to a cyrstallization when it is allowed to stand for at least 3 hours under an atmosphere at 190° C. and which does not possess distinct crystallization or crystal fusing peaks as measured by DSC. The Tg is a value determined from the transition point of the latent heat by DSC when heated at an elevating rate of 10° C./min.

The molecular weight of the amorphous polyeter (B) used in the present invention is not particularly limited unlss the film-forming properties of the composition are hindered. The amorphous polyester (B) has usually an I.V. of at least 0.6 dl/g, preferably from 0.8 to 0.9 dl/g as measured in ortho-chlorophenol at 25° C.

The commercially available amorphous polyesters (B) as described above include KODAR ® PETG and PCTA which are products manufactured by Eastman Kodak.

(C) Silane Coupling Agent

Silane coupling agents (C) are incorporated into the amorphous polyester compositions of the present invention to improve the adhesion properties of the composition comprising the modified low crystalline polyolefin (A) and amorphous polyester (B) described above, particularly to improve the initial adhesion properties or water-resistant adhesion properties to different materials such as metal during high speed lamination. The incorporation of the silane coupling agent (C) increases the vibration loss coefficient $\eta$ at the same blend proportions of (A) and (B) as compared with the composition containing no silane coupling agent. Thus, the incorporation of the silane coupling agent also exhibits such an unexpected effect that the damping performance is improved.

Known various silane coupling agents can be used in the present invention. Of these, gamma-glycidoxypropyltrimethoxysilane and beta-(3,4-eopxycyclohexyl)ethyltrimethoxysilane are preferable. The former is most preferable. However, the other silane coupling agents may be used. Examples of such silane coupling agents are examplified in "Crosslinking Agent Handbook" pp 558-561 published by Taisei Sha, Japan.

The first amorphous polyester composition according to the present invention is a blend of the (A), (B) and (C) components described above. In this blend, (A) is present from 30% to 60% by weight, preferably from 40% to 50% by weight, (B) is present from 40% to 70% by weight, preferably from 50% to 60% by weight, and (C) is incorporated in an amount of from 0.05 to 4 parts by weight, preferably from 1 to 2 parts by weight per 100 parts by weight of the total amount of (A) and (B). Further, in the composition, the low crystallline polyolefin (A) should form a matrix phase and the amorphous polyester (B) should form a domain phase. If the resins constituting the matrix and domain phases are contrary to the case described above, the long term water-resistant adhesion durability cannot be expected possibly due to the water absorption properties of the polyester and the thin film-forming properties are lowered.

As described above, in the present invention modified products of low crystalline polyolefins are used as the modified polyolefins. If modified high crystalline polyolefins are used as the modified polyolefins, the blend system of the modified high crystalline polyolefin and the amorphous polyester cannot exhibit sufficient adhesion strength even if the silane coupling agent is used in the combination with the high crystalline components. If such a blend is adhered and laminated to different materials such as metal, the aggregation and break of the inner resins tend to occur under a low stress and the formability and processability tend to be lowered. Further, in the blend ratio described above, if the proportion of (A) is too small, the constitution of the matrix and domain phases will be reversed to form a composition exhibiting poor adhesion properties and processability. If the proportion of (A) is too large, the damping performance will be lowered. If the proportion of (C) is too small, the water-resistant adhesion properties and damping performance will not be improved. If the proportion of (C) is too large, the composition will become rigid to lower the damping performance and processability.

It is possible to confirm that the present composition has the phase structure as described above by observing by means of an electron microscope.

(D) Inorganic Filler

A second amorphous polyester composition according to the present invention can contain an inorganic filler in addition to the components (A), (B) and (C) as described above.

The incorporation of the inorganic filler (D) into the amorphous polyester composition facilitates the granulation of said amorphous polyester composition. The amorphous polyester composition comprising the above components (A), (B) and (C) is granulated by means of a granulator after premixing by means of a Henschel mixer or tumbling mixer. During this time, if only the three components are used, blocking may occur at the hopper of the granulator and no raw materials are normally fed to the granulator in some cases. In such case, the addition of the inoganic filler (D) to the amorphous polyester composition in addition to the above components (A), (B) and (C) can prevent any blocking.

Examples of the inorganic fillers (D) which can be used herein include known inorganic fillers such as talc, silica, calcium carbonate, clay, and mica. When the damping material is obtained in the form of a film, the particle size and particle size distribution are suitably selected so that the film-forming properties are not impaired.

The second amorphous polyester composition according to the present invention is a blend of the above components (A)–(D), wherein (A) is present from 30% to 60% by weight, preferably from 40% to 50% by weight, (B) is present from 40% to 70% by weight, preferably from 50% to 60% by weight, (C) is incorporated in an amount of from 0.05 to 4 parts by weight, preferably from 1 to 2 parts by weight per 100 parts by weight of the total amount of (A) and (B), and (D) is incorporated in an amount of from 0.5 to 4 parts by weight, preferably from 1 to 2 parts by weight per 100 parts by weight of the total amount of (A) and (B). Further, in the composition, the low crystalline polyolefin (A) should form a matrix phase and the amorphous polyester (B) should form a domain phase. If the resins constituting the matrix and domain phases are contrary to the case described above, the long term water-resistant adhesion durability cannot be expected possibly due to the water absorption properties of the polyester and the thin film-forming properties are lowered.

The amounts of the components (A), (B) and (C) used in the second amorphous polyester composition according to the present invention are determined by the same reasons as those of the first amorphous polyester composition according to the present invention. If the amount of the inorganic filler (D) used is too small or too large, the formability and processability during granulation process or during film formation process will be lowered.

The composition of the present invention is obtained by a process wherein (A), (B), (C) and optional (D) are simultaneously molten and blended; or by a another process wherein (B), (C) and (D) are molten and blended and thereafter (A) is added to the resulting mixture to melt and blend all of the component.

Other resins may be incorporated into the amorphous polyester compositions according to the present invention in the range which does not significantly impair their properties. Examples of such resins include ethylene-(meth) acrylic acid copolymers, ethylene-(meth) acrylic acid salt copolymers, ethylene-(meth) acrylic ester copolymers. Of course, it will be obvious to those skilled in the art that other known resins can be used.

While the amorphous polyester compositions according to the present invention are suitable for various uses, it is possible to use them as damping materials, particularly high temperature damping materials by expecting their damping performance. That is, the amorphous polyester compositions according to the present invention have a large loss coefficient $\eta$ at a temperature of at least 80° C., particularly from 80° to 100° C. and therefore are suitable for use as damping materials for the engine peripheral members such as oil pans. In this case, many compositions are used in the form of a metal plate-composite laminate.

A method of utilizing the damping material comprising the composite laminate will be then described. Said composite laminates for damping materials are laminates wherein at least one outer layer is composed of metal, and at least one intermediate layer interposed between the metal is composed of amorphous polyester composition as mentioned above. In addition to the outer layer composed of metal, one layer of the intermediate layers may be formed from metal. Examples of the structures of said composite laminate are as follows:

(i) Metal/Composition;
(ii) Metal/Composition/Metal;
(iii) Metal/Composition/Metal/Composition; and
(iv) Metal/Composition/Metal/Composition/Metal Of these composite laminates, a composite laminate (ii) having a three layer structure is particularly suitable for use herein. Said composite laminates can be utilized in the form of a plate, cylinder, square pillar, or other optional shape.

Examples of metals constituting said composite laminates include iron, steel, copper, aluminum, stainless steel, and brass. While the thickness of said metal is optional, it is usually in the range of from 0.1 to 2 mm, preferably from 0.2 to 1 mm. Further, the thickness of the composition layer is optional, it is usually in the range of from 0.02 to 3 mm, preerably from 0.03 to 0.15 mm.

EFFECTS OF THE INVENTION

The amorphous polyester compositions according to the present invention have excellent adhesion properties to different materials such as metal, and have excellent damping performance. Accordingly, the damping materials having excellent initial adhesion properties and water-resistant adhesion properties and excellent damping performance, particularly at high temperatures are obtained from such amorphous polyester compositions.

While the present invention is illustrated by suitable examples, the present invention is not restricted thereto unless otherwise indicated.

EXAMPLES 1 THROUGH 4

A mixture of 0.015 part by weight of acetone and 0.5 parts by weight of maleic anhydride was added dropwisely to 100 parts by weight of an ethylene/1-butene random copolymer having a crystallinity of 17% and an ethylene content of 90 mole %, and the components were mixed by means of a Henschel mixer. The reaction mixture was granulated at a temperature of 240° C. by means of an extruder having a diameter of 40 mm to obtain a maleic anhydride grafted ethylene/1-butene random copolymer having a crystallinity of 15%, an MFR of 3 g/10 min., an amount of maleic anhydride grafted of 0.35% by weight. This random copolymer is referred to as an unsaturated carboxylic acid-modified low crystalline polyolefin (A-1) which forms a matrix phase.

Copolymerization was carried out in a molar ratio of isophthalic acid/terephthalic acid/ethylene glycol/1,3-bis(2-hydroxyethoxy)benzene/trihydroxymethylpropane of 90/10/85/15/0.3 to obtain an amorphous polyester having an I.V. of 0.85 dl/g. This amorphous polyester is referred to as an amorphous polyester (B-1) which forms a domain phase.

The resins (A-1) and (B-1) described above were mixed in weight ratios shown in Table 1. During mixing, gamma-glycidoxypropyltrimethoxysilane was added dropwisely as a silane coupling agent (C-1) in an amount of 1 part by weight per 100 parts by weight of the total weight of (A-1) and (B-1) and they were mixed.

The reaction mixture was granulated by means of an extruder having a diameter of 40 mm, and thereafter film formation was carried out by means of a T-die to form a film having a thickness of 70 micrometers.

This film was interposed between two low carbon steel plates degreased with an alkaline cleaner and having a thickness of 0.8 mm, and press molding was carried out for 10 minutes at a temperature of 190° C. to obtain a damping steel plate.

The resulting damping steel plate was subjected to a peeling test by means of a T mold having a width of 25 mm at a pulling rate of 10 mm/min. A portion of the steel plates of both outer layers were cut, and a shearing test of core resins at an area having a width of 20 mm and a length of 10 mm was carried out at a pulling rate of 10 mm/min. The vibration loss factor $\eta$ was measured by a cantilever resonance vibration decay method. The results are shown in Table 1.

An electron micrograph of the cross-section of the core film obtained in Example 1 is shown in FIG. 1. As can be seen from FIG. 1, the particulate portion is composed of a polyester and the polyester forms a domain phase.

EXAMPLE 5

Resins (A-1) and (B-1) wwere provided as in Example 1, and a modified polyolefin (D-1) consisting of a low density polyethylene, methacrylic acid and butyl acrylate was added to the matrix phase. Such resins were mixed in a weight ratio of (A-1)/(B-1)/(D-1) of 33/67/13. During this time, (C-1) was added as in Example 1, and a damping steel plate was produced as in Example 1. This damping steel plate was evaluated. The results are shown in Table 1.

EXAMPLE 6

A damping steel plate was produced as in Example 5 except that an ionomer obtained by treating a resin (D-2) with a sodium ion was used. The resulting damping steel plate was evaluated. The results are shown in Table 1.

EXAMPLE 7

A damping steel plate was produced as in Example 2 except that the amount of the silane coupling agent (C-1) added was 0.5 parts by weight per 100 parts by weight of the total amount of (A-1) and (B-1). The T peeling strength and shearing strength of the resulting damping steel plate were 20 kg/25 mm and 120 kg/cm$^2$, respectively.

EXAMPLE 8

A damping steel plate was produced as in Example 7 except that the amount of (C-1) added was 4 parts by weight per 100 parts by weight of the total amount of (A-1) and (B-1). The T-peeling strength and shearing strength of the resulting damping steel plate were 25 kg/25 mm and 180 kg/cm$_2$, respectively. It was slightly difficult to form a film having a thickness of 70 micrometers.

COMPARATIVE EXAMPLE 1

A damping steel plate was produced as in Example 1 except that the resin (A-1) and silane coupling agent (C-1) were not used and that the domain phase was formed from only Kodar ® PET G 6763 available from Eastman Kodak. The resulting damping steel plate was evaluated. The results are shown in Table 1.

COMPARATIVE EXAMPLE 2

A damping steel plate was produced as in Comparative Example 1 except that the domain phase was formed from the resin (B-1) described in Example 1. The resulting damping steel plate was evaluated. The results are shown in Table 1.

COMPARATIVE EXAMPLES 3 THROUGH 6

Films were obtained as in Example 1 except that no silane coupling agent (C-1) was used. Further, in order to improve the adhesion strength, each of the films was interposed between two maleic anhydride-modified high density polyethylene film having a thickness of 15 micrometers to form a three-layer film. The three-layer film was processed as in Example 1 to produce a damping steel plate. The damping steel plate was evaluated. The results are shown in Table 1.

ried out for 10 minutes at a temperature of 190° C. to obtain a damping steel plate.

The resulting damping steel plate was subjected to a peeling test by means of a T mold having a width of 25 mm at a pulling rate of 10 mm/min. A portion of the steel plates of both outer layers were cut, and a shearing test of core resins at an area having a width of 20 mm and a length of 10 mm was carried out at a pulling rate of 10 mm/min. The vibrationloss factor $\eta$ was measured by a cantilever resonance vibration decay method. The results are shown in Table 2.

TABLE 1

| | Core Resin Composition | | | Adhesion Strength of Steel/Resin/Steel | | Vibration Loss Factor $\eta$ (500 Hz) | | | |
|---|---|---|---|---|---|---|---|---|---|
| | Component A % | Component B % | Component C part by weight | T-peeling Strength Kg/25 mm | Shearing Strength Kg/cm$^2$ | 70° C. | 80° C. | 90° C. | 100° C. |
| Comparative Example | | | | | | | | | |
| 1 | 0 | 100 | 0 | 2 | — | 0.013 | 0.012 | 0.057 | 0.30 |
| 2 | 0 | 100 | 0 | 2 | — | 0.032 | 0.11 | 0.34 | 0.26 |
| 3 | 30 | 70 | 0 | 5 | 60 | 0.040 | 0.12 | 0.28 | 0.25 |
| 4 | 40 | 60 | 0 | 13 | 80 | 0.049 | 0.13 | 0.20 | 0.18 |
| 5 | 50 | 50 | 0 | 23 | 50 | 0.058 | 0.092 | 0.15 | 0.12 |
| 6 | 60 | 40 | 0 | 40 | 40 | 0.064 | 0.082 | 0.11 | 0.090 |
| Example | | | | | | | | | |
| 1 | 30 | 70 | 1 | 23 | 190 | 0.092 | 0.30 | 0.23 | 0.12 |
| 2 | 40 | 60 | 1 | 30 | 150 | 0.095 | 0.30 | 0.21 | 0.12 |
| 3 | 50 | 50 | 1 | 25 | 135 | 0.18 | 0.19 | 0.16 | 0.095 |
| 4 | 60 | 40 | 1 | 13 | 100 | 0.14 | 0.12 | 0.090 | 0.070 |
| 5 | 33 | 67 | 1 | 25 | 180 | 0.14 | 0.32 | 0.20 | 0.10 |
| 6 | 33 | 67 | 1 | 20 | 160 | 0.085 | 0.22 | 0.25 | 0.14 |

COMPARATIVE EXAMPLE 7

Example 1 was repeated except that the weight ratio of the resin (A-1) to the resin (B-1) was 20:80. During film formation by means of a T-die, it was difficult to obtain a thin film having a thickness of no more than 100 micrometers.

As can be seen from the results, the damping steel plates formed from the first amorphous polyester compositions according to the present invention simultaneously satisfy characteristics of the damping steel plates required for automobile engine peripheral uses (such as oil pans and cylinder covers), i.e., three requirements: a T peeling strength of at least 10 kg/25 mm, a core shearing strength of at least 100 kg/cm$^2$ and a high value of a vibration loss coefficient $\eta$ in the range of from 80° to 100° C. (at least a portion thereof exhibits a $\eta$ of at least 0.1).

EXAMPLES 9 THROUGH 12

(A-1) and (B-1) prepared in Example 1 were used in weight ratios shown in Table 2. During mixing, talc manufactured by Nippon Taruku (Micro Ace P-3 having an average particle diameter of 1.8 micrometers) was mixed as a filler (D-1) in an amount of 1 part by weight per 100 parts by weight of the total weight of (A-1) and (B-1), and gamma-glycidoxypropyltrimethoxysilane was added dropwisely and admixed as a silane coupling agent (C-1) in an amount of 1 part by weight per 100 parts by weight of the total weight of (A-1) and (B-1).

The reaction mixture was granulated by means of an extruder having a diameter of 40 mm, and thereafter film formation was carried out by means of a T-die to form a film having a thickness of 70 micrometers.

This film was interposed between two low carbon steel plates degreased with an alkaline cleaner and having a thickness of 0.8 mm, and press molding was car-

EXAMPLE 13

Resins (A-1) and (B-1) were provided as in Example 9, and a modified polyolefin (E-1) consisting of a low density polyethylene, methacrylic acid and butyl acrylate was added to the matrix phase. Such resins were mixed in a weight ratio of (A-1)/(B-1)/(E-1) of 33/67/13. During this time, (C-1) and (D-1) were added as in Example 9, and a damping steel plate was produced as in Example 9. This damping steel plate was evaluated. The results are shown in Table 2.

EXAMPLE 14

A damping steel plate was produced as in Example 13 except that an ionomer obtained by treating a resin (E-1) with a sodium ion was used. The resulting damping steel plate was evaluated. The results are shown in Table 2.

EXAMPLE 15

A damping steel plate was produced as in Example 10 except that the amount of the silane coupling agent (C-1) added was 0.5 parts by weight per 100 parts by weight of the total amount of (A-1) and (B-1). The T-peeling strength and shearing strength of the resulting damping steel plate were 20 kg/25 mm and 120 kg/cm$^2$, respectively.

EXAMPLE 16

A damping steel plate was produced as in Example 15 except that the amount of (C-1) added was 4 parts by weight per 100 parts by weight of the total amount of (A-1) and (B-1). The T-peeling strength and shearing strength of the resulting damping steel plate were 25 kg/25 mm and 180 kg/cm$^2$, respectively. It was slightly difficult to form a film having a thickness of 70 micrometers.

EXAMPLE 17

A film was tried to be produced as in Example 10 except that the amount of the filler (D-1) added was 0.5 parts by weight per 100 parts by weight of the total amount of (A-1) and (B-1). It was observed that the mixture exhibited slight blocking during granulation.

COMPARATIVE EXAMPLE 14

A damping steel plate was produced as in Example 10 except that (A-1) forming the matrix phase of Example 10 was replaced with a mixture of a resin (A-1) and a maleic anhydride-modified high density polyethylene having a crystallinity of 60% in a weight ratio of 7:3. The T-peeling strength of this damping steel plate was low (2 kg/25 mm) and poor.

TABLE 2

| | Core Resin Composition | | | | Adhesion Strength of Steel/Resin/Steel | | Vibration Loss Factor $\eta$ (500 Hz) | | | |
|---|---|---|---|---|---|---|---|---|---|---|
| | Component A % | Component B % | Component C part by weight | Component D part by weight | T-peeling Strength Kg/25 mm | Shearing Strength Kg/cm$^2$ | 70° C. | 80° C. | 90° C. | 100° C. |
| Comparative Example | | | | | | | | | | |
| 8 | 0 | 100 | 0 | 0 | 2 | — | 0.013 | 0.12 | 0.057 | 0.30 |
| 9 | 0 | 100 | 0 | 0 | 2 | — | 0.032 | 0.11 | 0.34 | 0.26 |
| 10 | 30 | 70 | 0 | 0 | 5 | 60 | 0.040 | 0.12 | 0.28 | 0.25 |
| 11 | 40 | 60 | 0 | 0 | 13 | 80 | 0.049 | 0.13 | 0.20 | 0.18 |
| 12 | 50 | 50 | 0 | 0 | 23 | 50 | 0.058 | 0.092 | 0.15 | 0.12 |
| 13 | 60 | 40 | 0 | 0 | 40 | 40 | 0.064 | 0.082 | 0.11 | 0.090 |
| Example | | | | | | | | | | |
| 9 | 30 | 70 | 1 | 1 | 25 | 200 | 0.090 | 0.32 | 0.26 | 0.13 |
| 10 | 40 | 60 | 1 | 1 | 34 | 165 | 0.10 | 0.30 | 0.23 | 0.12 |
| 11 | 50 | 50 | 1 | 1 | 29 | 140 | 0.17 | 0.20 | 0.15 | 0.10 |
| 12 | 60 | 40 | 1 | 1 | 17 | 105 | 0.12 | 0.12 | 0.084 | 0.070 |
| 13 | 33 | 67 | 1 | 1 | 27 | 170 | 0.13 | 0.35 | 0.20 | 0.11 |
| 14 | 33 | 67 | 1 | 1 | 25 | 180 | 0.070 | 0.24 | 0.27 | 0.15 |

EXAMPLE 18

A damping material was produced as in Example 10 except that the amount of the filler (D-1) added was 4 parts by weight per 100 parts by weight of the total amount of (A-1) and (B-1). The T-peeling strength and shearing strength of the resulting damping material were 12 kg/25 mm and 130 kg/cm$^2$, respectively. Such properties were unstable.

COMPARATIVE EXAMPLE 8

A damping steel plate was produced as in Example 9 except that the resin (A-1), silane coupling agent (C-1) and filler (D-1) were not used and that the domain phase was formed from only Kodar ® PET G 6763 available from Eastman Kodak. The resulting damping steel plate was evaluated. The results are shown in Table 2.

COMPARATIVE EXAMPLE 9

A damping steel plate was produced as in Comparative Example 9 except that the domain phase was formd from the resin (B-1) described in Example 1. The resulting damping steel plate was evaluated. The results are shown in Table 2.

COMPARATIVE EXAMPLES 10 THROUGH 13

Films were obtained as in Example 9 except that the silane coupling agent (C-1) and filler (D-1) were not used. Further, in order to improve the adhesion strength, each of the films was interposed between two maleic anhydride-modified high density polyethylene film having a thickness of 15 micrometers to form a three-layer film. The three-layer film was processed as in Example 1 to produce a damping steel plate. The damping steel plate was evaluated. The results are shown in Table 2.

COMPARATIVE EXAMPLE 15

Example 9 was repeated except that the weight ratio of the resin (A-1) to the resin (B-1) was 20:80. During film formation by means of a T-die, it was difficult to obtain a thin film having a thickness of no more than 100 micrometers.

As can be seen from the results, the damping steel plates formed from the second amorphous polyester compositions according to the present invention simultaneously satisfy characteristics of the damping steel plates required for automobile engine peripheral uses (such as oil pans and cyliner covers), i.e., three requiremens: a T peaking strength of at least 10 kg/25 mm, a core shearing strength of at least 100 kg/cm$^2$ and a high value of a vibration loss factor $\eta$ in the range of from 80° to 100° C. (at least a portion thereof exhibits a $\eta$ of at least 0.1).

Figure 2:

An electron micrograph of the cross-section of the core film obtained in Example 10 is shown in FIG. 2, As can be seen from FIG. 2, the particulate portion is composed of a polyester and the polyester forms a domain phase.

What is claimed is:

1. A vibration damping material comprising an amorphous polyester composition comprising (A) a low crystalline polyolefin having a crystallinity of no more than 20% modified with an unsaturated carboxylic acid, (B) an amorphous polyester and (C) a silane coupling agent, wherein (A) is present from 30% to 60% by weight; (B) is present from 40% to 70% by weight; (C) is present from 0.05 to 4 parts by weight per 100 parts by weight of the total amount of (A) and (B); and (A) forms a matrix phase, and (B) forms a domain phase.

2. A vibration damping material according to claim 1 wherein the unsaturated carboxylic acid is maleic acid, endocis-bicyclo[2.2.1]-hept-5-ene-2,3-dicarboxylic acid or acid anhydrides thereof.

3. A vibration damping material according to claim 1 wherein from 15 to 100 mole % of the dicarboxylic acid component of the amorphous polyester (B) is isophthalic acid and the remainder is terephthalic acid, and wherein from 5 to 90 mole % of the dihydroxy compound component is 1,3-bis(2-hydroxyethoxy)benzene and/or 1,4-bis(2-hydroxyethoxy)-benzene and the remainder is ethylene glycol.

4. A vibration damping material according to claim 1 wherein the silane coupling agent (C) is gamma-glycidoxypropyl-trimethoxysilane.

5. A vibration damping material according to claim 1 wherein (A) is present from 40% to 50% by weight, (B) is present from 50 to 60% by weight and (C) is present from 1 to 2 parts by weight per 100 parts by weight of the total amount of (A) and (B).

6. The vibration damping material according to claim 1 which is laminated with metal.

7. The vibration damping material according to claim 1 which is in the form of a laminated composite structure comprising an intermediate layer of said amorphous polyester composition interposed between first and second layers composed of metal, at least one of said first and second layers being an outer layer.

8. The vibration damping material according to claim 6 characterized by a T-peel strength of at least 10 kg/25 mm, a core shearing strength of at least 100 kg/cm$^2$ and a high value of vibration loss coefficient of at least 0.1 in the temperature range of from 80° to 100° C.

9. A vibration damping material comprising an amorphous polyester composition comprising (A) a low crystalline polyolefin having a crystallinity of no more than 20% modified with an unsaturated carboxylic acid, (B) an amorphous polyester, (C) a silane coupling agent and (D) an inorganic filler, wherein (A) is present from 30% to 60% by weight; (B) is present from 40% to 70% by weight; (C) is incorporated in an amount of from 0.05 to 4 parts by weight per 100 parts by weight of the total amount of (A) and (B); (D) is incorporated in an amount of from 0.5 to 4 parts by weight per 100 parts by weight of the total amount of (A) and (B); (A) forms a matrix phase, and (B) forms a domain phase.

10. The vibration damping material according to claim 9 wherein the unsaturated carboxylic acid is maleic acid, endocis-bycyclo[2.2.1]hept-5-ene-2,3-dicarboxylic acid or acid anhydrides thereof.

11. The vibration damping material according to claim 9 wherein from 15 to 100 mole % of the dicarboxylic acid component of the amorphous polyester (B) is isophthalic acid and the remainder is terephthalic acid, and wherein from 5 to 90 mole % of the dihydroxy compound component is 1,3-bis(2-hydroxyethoxy)benzene and/or 1,4-bis(2-hydroxyethoxy)benzene and the remainder is ethylene glycol.

12. The vibration damping material according to claim 9 wherein the silane coupling agent (C) is gamma-glycidoxypropyltrimethoxysilane.

13. The vibration damping material according to claim 9 wherein the inorganic filler (D) is selected from the group consisting of talc, silica, calcium carbonate, clay and mica.

14. The vibration damping material according to claim 9 wherein (A) is present from 40 to 50% by weight, (B) is present from 50 to 60% by weight, (C) is incorporated from 1 to 2 parts by weight per 100 parts by weight of the total amount of (A) and (B), and (D) is incorporated from 1 to 2 parts by weight per 100 parts by weight of the total amount of (A) and (B).

15. The vibration damping material according to claim 9 which is a structure laminated with metal.

16. A vibration damping material according to claim 9 which is in the form of a laminated composite structure comprising a layer of said amorphous polyester composition interposed between layers composed of metal, at least one of said metal layers being an outer layer.

17. The vibration damping material according to claim 15 characterized by a T-peel strength of at least 10 kg/25 mm, a core shearing strength of at least 100 kg/cm$^2$ and a high value of vibration loss coefficient of at least 0.1 in the temperature range of from 80° to 100° C.

* * * * *

UNITED STATES PATENT AND TRADEMARK OFFICE
CERTIFICATE OF CORRECTION

PATENT NO.  : 4,849,293
DATED       : July 18, 1989
INVENTOR(S) : Hitoshi Koga; Kazuo Iwata, Masushi Nishimoto, Mikio Hashimoto It is certified that error appears in the above-identified patent and that said Letters Patent is hereby corrected as shown below:

On the title page Item (75)

Inventors:  Delete "Mishimoto", insert --Nishimoto--;
            Delete "Nikio", insert --Mikio--.

Signed and Sealed this

Eighth Day of May, 1990

*Attest:*

HARRY F. MANBECK, JR.

*Attesting Officer*  *Commissioner of Patents and Trademarks*